June 30, 1925.

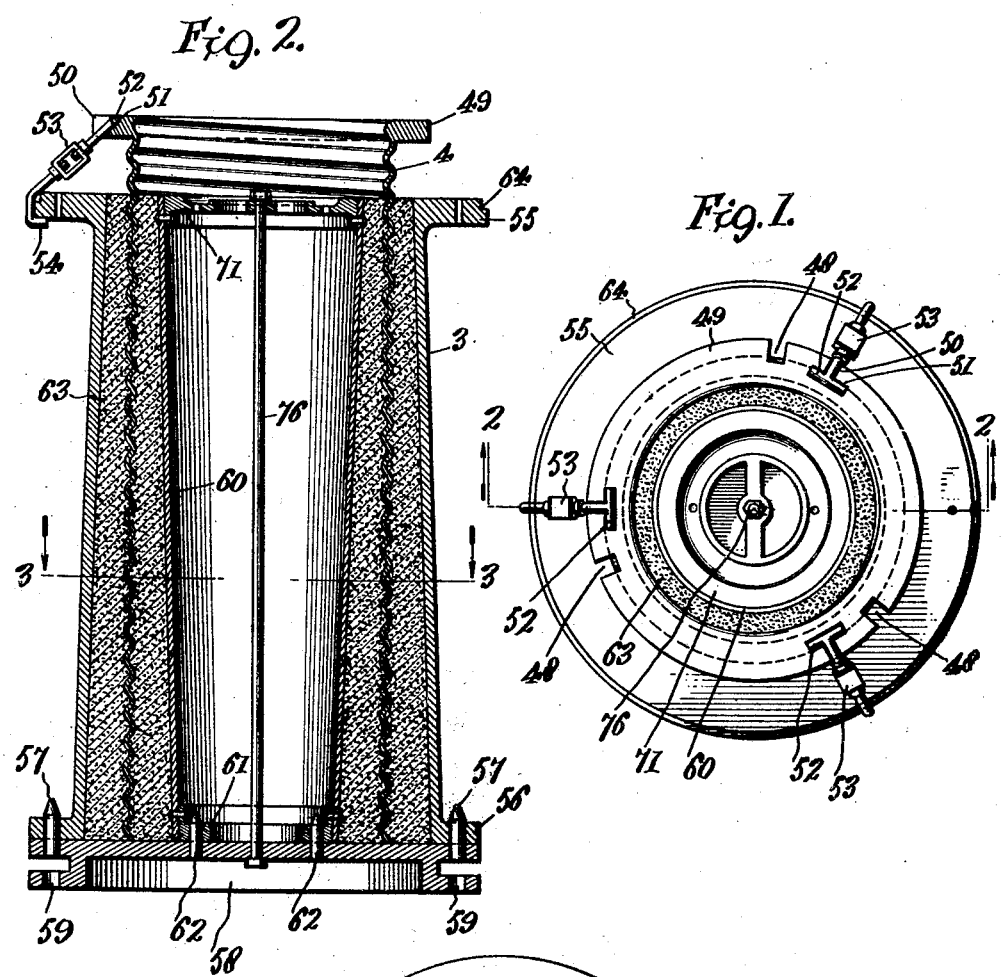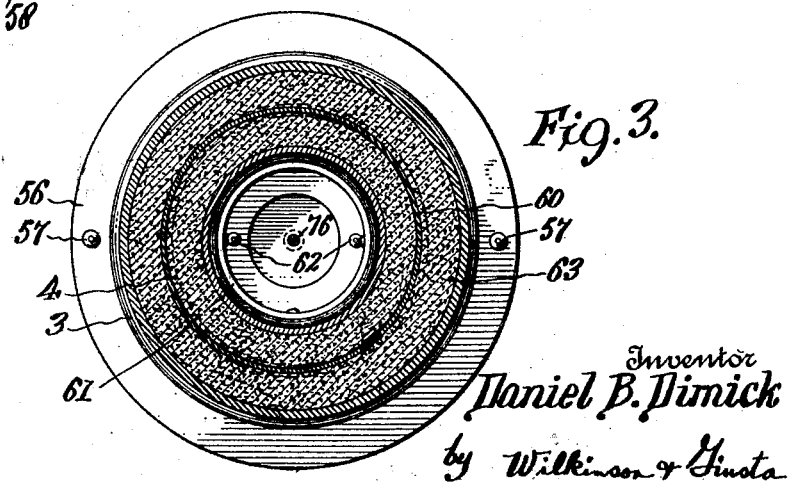

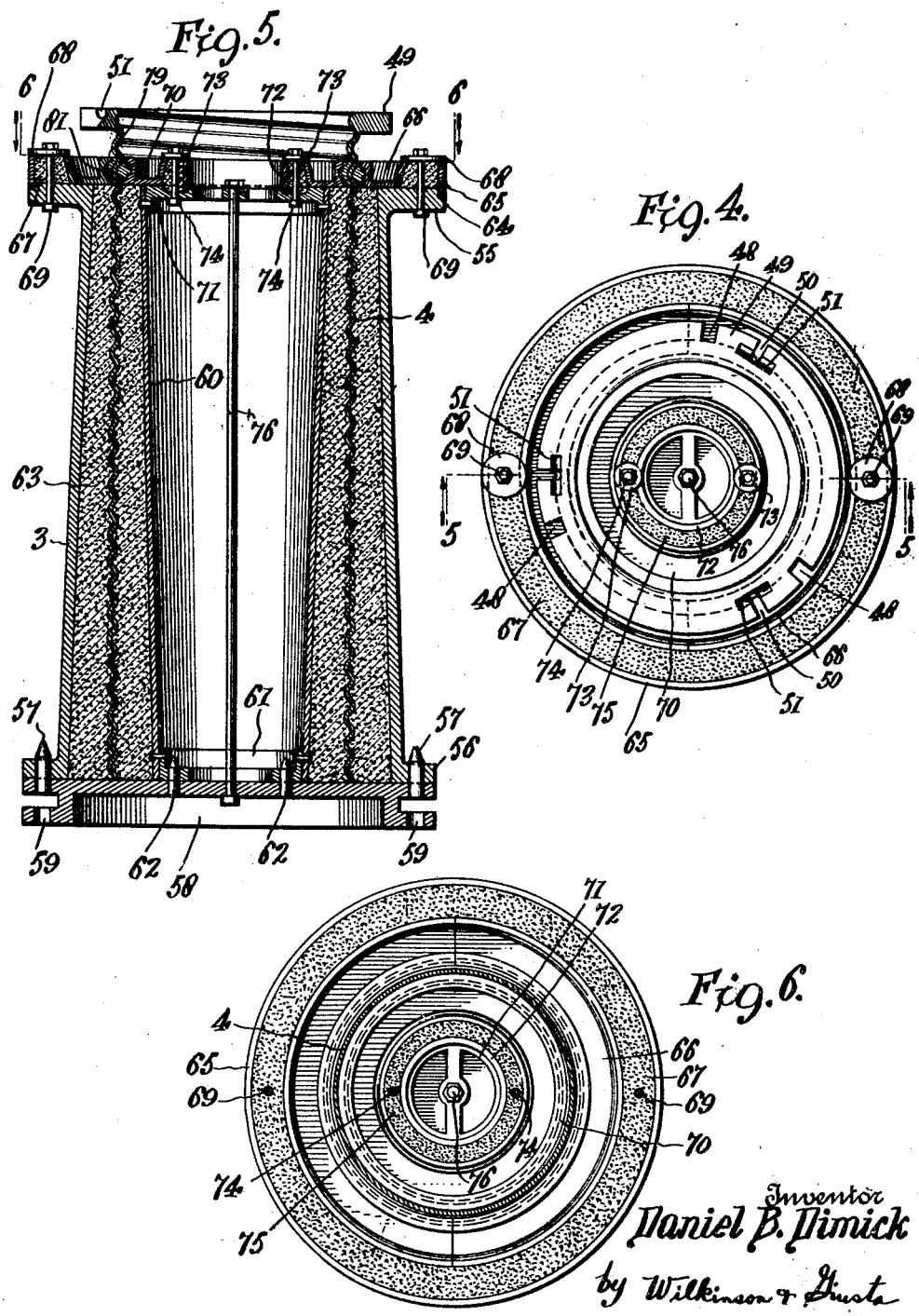

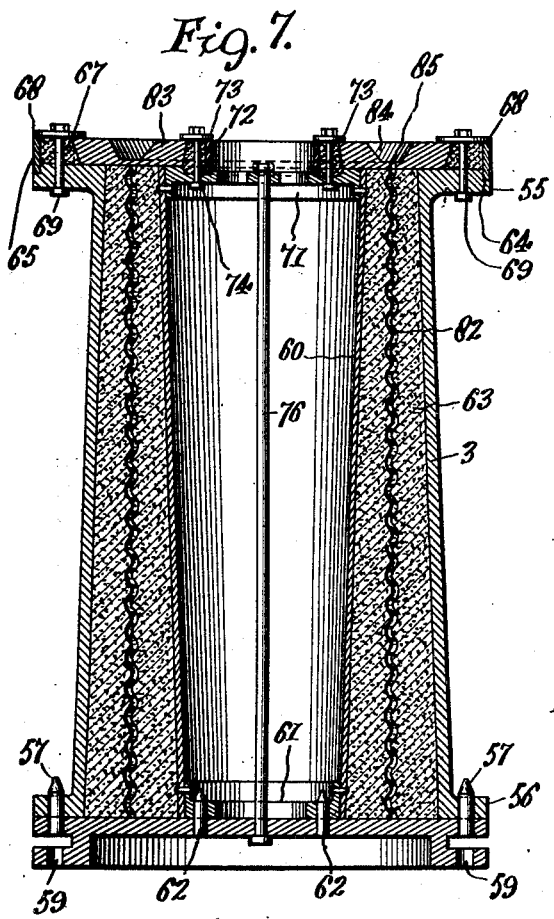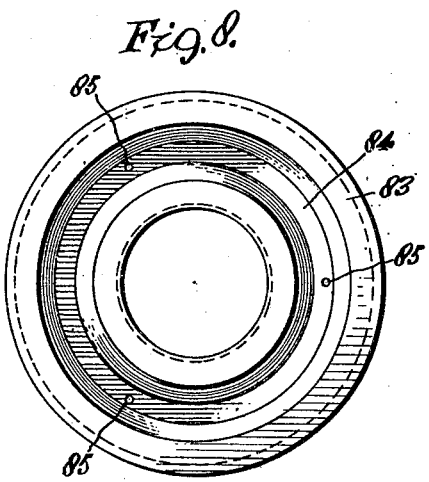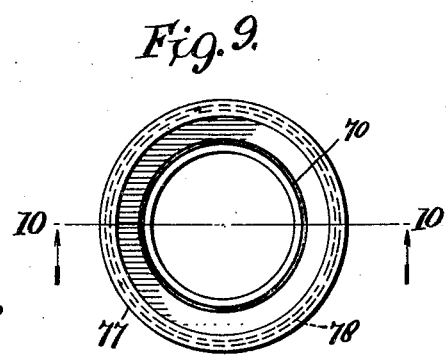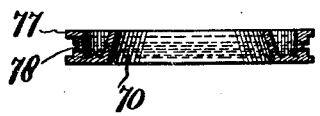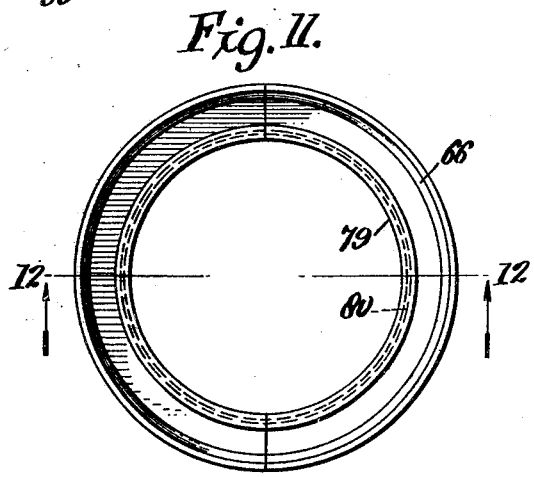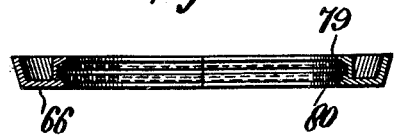

D. B. DIMICK 1,544,058

PIPE MOLD

Original Filed Sept. 16, 1922    4 Sheets-Sheet 4

Inventor
Daniel B. Dimick
by Wilkinson & Giusta
Attorneys

Patented June 30, 1925.

1,544,058

UNITED STATES PATENT OFFICE.

DANIEL BAKER DIMICK, OF BIRMINGHAM, ALABAMA.

PIPE MOLD.

Original application filed September 16, 1922, Serial No. 588,649. Divided and this application filed January 22, 1924. Serial No. 687,867.

*To all whom it may concern:*

Be it known that I, DANIEL BAKER DIMICK, a citizen of the United States, residing at Birmingham, in the county of Jefferson and State of Alabama, have invented certain new and useful Improvements in Pipe Molds; and I do hereby declare the following to be a full, clear, and exact description of the invention, such as will enable others skilled in the art to which it appertains to make and use the same.

The present invention relates to improvements in pipe molds and this application is a division of my prior copending application filed September 16, 1922, Serial No. 588,649.

An object of the invention is to produce an improved mold for use in the manufacture of a cast thin-walled spirally corrugated seamless metal pipe, the cast pipe per se forming the subject matter of my copending application filed September 16, 1922, Serial No. 588,650.

Another object of the invention is to produce a mold to receive a seamless cylindrical and spirally corrugated pattern having a thin wall whereby to impose on the sand in the mold spiral corrugations on both inner and outer walls of the cavity to the end that the pipe may be cast in one operation with corrugated spiral walls both within and without.

A further object of the invention resides in providing a mold adapted to cast the pipe in toto at one operation not in sections but as a seamless and integral structure without setting up rupturing strains in the metal during the cooling of the pipe by providing for the removal of the core shortly after pouring of the molten metal.

Other objects are to improve the construction of molds, pouring cores and strippers and to provide in conjunction with the arbor wings or plates adapted to remain in the sand after the arbor is removed to sustain the same and prevent shearing but allowing is to yield inwardly as the metal shrinks without disintegrating the structure.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a plan view of the mold showing the pattern therein.

Figure 2 is a vertical section taken on the line 2—2 in Figure 1.

Figure 3 is a cross section taken on the line 3—3 in Figure 2.

Figure 4 is another plan view of the mold showing the pattern still in place and with the stripping appliance.

Figure 5 is a vertical section taken on the line 5—5 in Figure 4.

Figure 6 is a transverse section taken on the line 6—6 in Figure 5.

Figure 7 is a vertical section through the mold after the pattern has been removed and the pouring core has been placed thereon.

Figure 8 is a plan view of the same.

Figure 9 is a plan view of the internal stripping ring.

Figure 10 shows a section taken diametrically therethrough on the line 10—10 in Figure 9.

Figure 11 is a plan view of the outer stripping ring.

Figure 12 is a central section taken on the line 12—12 in Figure 11.

Figure 13:
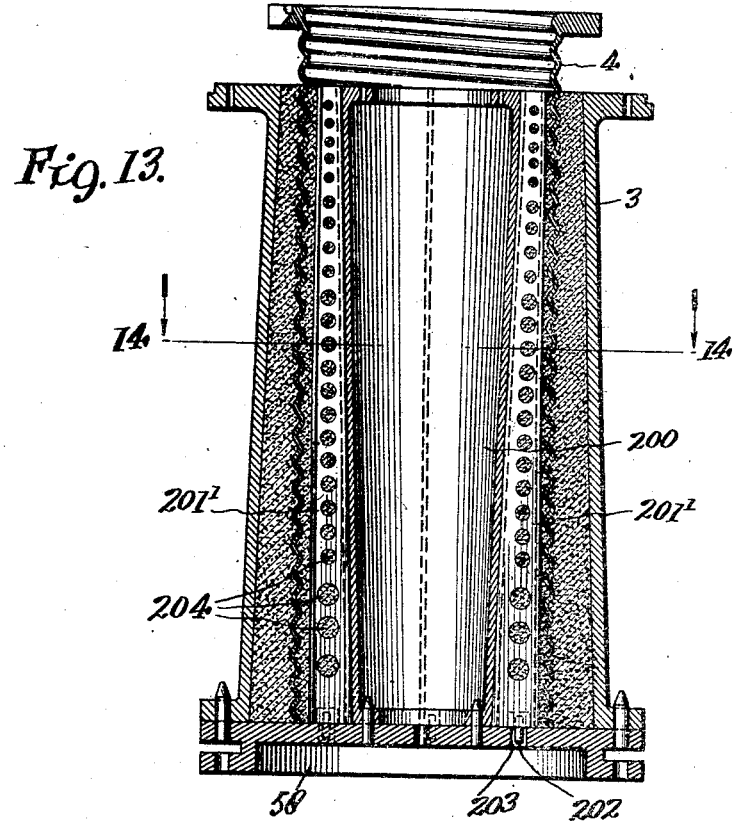
Figure 13 shows a vertical section through a modified form of mold.
Figure 14:
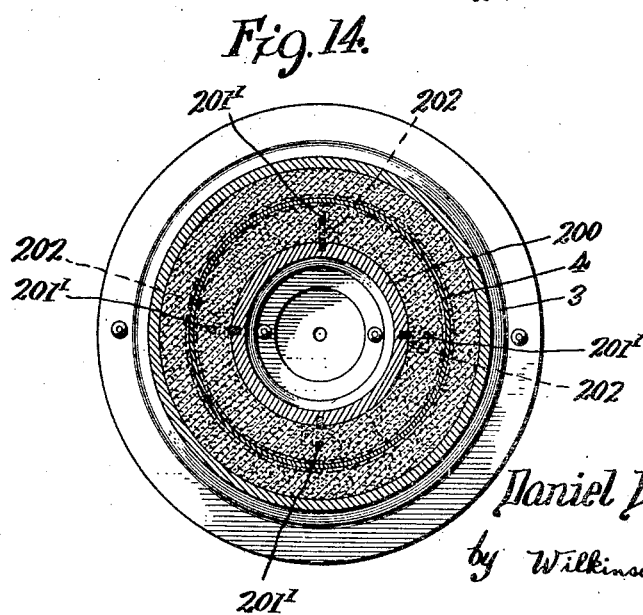
Figure 14 is a horizontal section taken on the line 14—14 in Figure 13.

Referring more particularly to the drawings, 3 designates the cope or jacket of the mold and 4 the pattern which is a spirally corrugated thin seamless cylinder having a flange 49 at its upper end provided with slots 48 as shown in Fig. 1 to receive the bolts by which the pattern is secured to the elevating and lowering device.

The flange 49 of the pattern is also provided with slots 50 in suitable numbers having cross sockets 51 adapted to receive the T heads 52 upon turn-buckles 53 which have catches 54 on their opposite ends adapted to take beneath the flange 55 of the outer mold shell or cope 3.

The base of the outer jacket 3 is provided with an out-turned flange 56 perforated to receive the pins 57 projecting up from the casting stool 58. The pins provide for centering the cope upon the casting stool and the casting stool is also preferably provided with a bottom perforated flange 59 to receive pins projecting up from the jolter table to properly locate this stool and the mold thereon and to restrain any lateral movement of the casting stool on the jolter table while the mold is being jolt-rammed by the action for instance of a pneumatic jolter. The core or arbor 60 is in the form of a thin frusto-conical shell 60 having a bottom head 61 secured thereto as by riveting and provided with a ring flange perforated to receive the positioning pins 62 on the casting stool 58. The arbor is thereby caused to assume a proper relation with respect to the cope. These pins 62 also avoid any tendency of the arbor to rotate when the pattern is screwed out of the finished mold.

It is seen that the cope 3 is also of frusto-conical form being narrower at its top in order to economize in the use of the sand, which is indicated at 63 and fills up the space between the arbor 60 and cope 3. The sand 63 after being properly treated with sea coal and facing in accordance with the usual foundry custom is filled in at opposite sides of the pattern 4 and assumes the spirally corrugated form of the pattern.

It will be noted that the flange 55 of the cope 3 is provided with a shoulder 64 to receive the ring 65 shown in Figure 5. This ring 65 co-operates with an annular channel ring 66 forming an outer strip ring, the outer flange of which is spaced from the outer ring 65 in order to provide a space for sand as indicated at 67 which is confined by the annular top plate 68 forming with the bolts 69 a clamp to hold the two rings in place. The external stripping ring 66 lies upon the outside of the pattern while an internal stripping ring 70 extends within the pattern and is supported by the upper head 71 of the arbor. The inner stripping ring also cooperates with an internal annulus 72 fitting in the shoulder depression of the top arbor head 71, this annulus and the inner stripping ring being held in place and suitably apart by the annular plate 73 and the clamp bolts 74, sand being made to occupy the space 75. The sand is hand-rammed into the space 67 and 75 and the top heads 71 of the arbor is held to the casting stool as by a central bolt 76.

The stripping rings are shown more particularly in Figures 9 to 12 inclusive and they each consist of skeleton plates. The internal ring is continuous in one piece while the outer ring is separable into two parts in order that it may be placed about the pattern. The inner ring is provided with a cavity 77 on its outer peripheral edges having a dove-tail socket 78 in which the babbitt is directly cast. In a similar way the inner flange of the outer stripping ring is provided with a cavity 79 and a dove-tail socket 80 to receive the external babbitt 81. The dove-tail slots provide for anchoring the babbitt securely in position and the mutually adjacent facing of the babbitt are spirally threaded in accordance with the pitch of the pattern in order that the pattern may be screwed forwardly therethrough.

Referring more particularly to Figures 7 and 8, the pattern is shown as having been removed leaving the mold cavity 82 into which the molten metal for forming the pipe is flowed through a top pouring core 83 which is channel construction in order to receive the molten metal into the trough 84 and to permit it to pass through the openings 85 in the mold cavity. The pouring core is put in place after the stripping rings are removed and is located by the core prints 67 and 75.

In use, the pattern 4 is first placed in the mold 3 while the mold occupies a position upon the table of the jolt-ramming machine and suitably treated sand is poured into the spaces at opposite sides of the core, the sand being replenished from time to time as the operation of jolt-ramming proceeds. During this time the pattern is held securely in place by use of the turn-buckles or clamps 53. After this operation has been concluded the clamps are removed and stripping rings 66 and 70 are applied to the top of the mold or in other words the mold is put in the conditions shown in Figure 5.

The pattern is then rotated and drawn up by the apparatus shown and described in the parent case Serial No. 588,649.

Now having removed the pattern, it remains to place the pouring core 83 upon the top of the mold or in other words to place the mold in the condition shown in Figure 7. For this purpose the stripping rings are of course removed and the sand prints 67 and 75 as aforesaid indicate where to place the core 83 in order that the openings 85 may register accurately with the cylindrical corrugated cavity 82. The clamp plates 68 and 73 are useful in holding the pouring core in position. The hot molten metal or cast iron is poured into the trough 84 and descending through the openings 85 is molded in the cavity 82 into a spirally corrugated relatively thin walled cast pipe having plain ends and initiating corrugated sheet metal pipe both in appearance, strength and durability. After pouring and while the pipe is still white hot and set the pouring core is stripped off, bolt 76 released and over head cranes hook on to and pull the entire core arbor 60 out of the mold; the pipe thus shrinks in cooling without meeting resistance, and prevents interval stress being set up in its wall structure. The mold is dismantled after the molded pipe has set and the parts are then in position to repeat the operation.

Referring more particularly to Figures 13 and 14, the jacket and stool are the same as shown in prior figures as is also the pattern, but the arbor 200 is made of an inverted frusto conical shape and provided with slots in its outer wall, these slots being shown as four in number and spaced at 90 degrees about the arbor. In these slots engage wings 201', which are loose therein and project out to within substantially one-half inch of the core or pattern. At their bases these wings carry pins 202 which engage in elongated slots 203 in the stool. The wings are also made with transverse perforations 204 therein in order to receive the sand to bind the wings in position and prevent the withdrawal thereof with the core.

The wings being put in position, the sand is rammed or jolted around through the initial space through the pattern and the arbor. However, the sand is preferably introduced by the use of a Beardsley sand slinger. When screwing the spiral corrugated pattern out of the mold a shearing of the sand about the arbor is apt to take place but the presence of the wings avoids this.

Pins 202 normally rest in the outer ends of the slots 203 which permits the wings to creep inwardly when the core is withdrawn. The mold is made and the pipe poured after withdrawal of the core in a manner already described. Just after pouring, overhead cranes are arranged to pull the arbor upwardly, leaving the four wings in the mold. As the casting shrinks in cooling and goes in, the wings are forced before it, the slots 203 allowing of this movement. There is therefore not set up in the walls of the pipe any internal stress by meeting resistance.

It is obvious that various changes and modifications may be made in the details of construction and design of the above specifically described embodiment of this invention without departing from the spirit thereof, such changes and modifications being restricted only by the scope of the following claims:

What is claimed is:

1. A molding apparatus for casting pipe comprising inner and outer mold members having an annular space therebetween for receiving the sand, and a spirally corrugated pattern adapted to pass centrally through the sand and having means at its upper end cooperating with the upper end of the outer member of the mold to hold such pattern against displacement, substantially as described.

2. A molding apparatus comprising inner and outer members having an annular space therebetween for receiving the sand, a flanged pattern extending centrally down through the sand and clamps engaged with the flange of the pattern and with the upper end of the mold, substantially as described.

3. A molding apparatus comprising an inner arbor, an outer cope spaced from the arbor and adapted to receive sand therebetween, and a spirally corrugated relatively thin walled pattern, extending down between said arbor and cope and adapted to form in the sand a spirally corrugated cavity for the casting of pipe, substantially as described.

4. An improved molding apparatus for casting spirally corrugated pipe comprising inner and outer members having a space therebetween for receiving the sand, a spirally corrugated pattern fitting down through the sand and adapted to be removed by an upwardly turning movement, and stripping members carried by the upper part of the mold for snugly engaging said pattern while the same is being threaded out of the mold, substantially as described.

5. An improved molding apparatus comprising cooperating members having a space to receive sand, a spirally corrugated pattern received into the space, internal and external stripping rings carried by the upper portion of the mold and having a snug fit against the pattern, said pattern having means at its outer end whereby it may be rotated and withdrawn upwardly through the stripping rings, substantially as described.

6. An improved molding apparatus comprising complemental members having a space to receive sand, a spirally corrugated pattern fitting in the sand and having an end projecting beyond the mold, inner and outer stripping rings carried by the upper end of the mold fitting snugly against the sides of the pattern, sand prints extending within and without said stripping rings, clamp means to hold the rings in place, and a pouring core adapted to be fitted to the top of the mold between said sand prints after the stripping rings and pattern have been removed, substantially as described.

7. A molding apparatus comprising a cope, a withdrawable arbor within the mold, and means mounted between the arbor and the pattern and interlocked in the sand for avoiding shearing of the sand when the pattern is removed from the mold, substantially as described.

8. A molding apparatus comprising a cope, a withdrawable tapered arbor having slots therein, wings loosely received in the slots and extending toward the pattern, said wings having openings therein to receive the sand, and a casting stool receiving the cope and arbor and supporting the wings for radial movement, substantially as described.

9. A molding apparatus comprising a cope, and a cone shaped arbor having wings protruding beyond its conical surface into the sand.

DANIEL BAKER DIMICK.